US006150008A

United States Patent [19]

Nakayama et al.

[11] Patent Number: 6,150,008

[45] Date of Patent: Nov. 21, 2000

[54] HEAT-SENSITIVE TRANSFER MEDIUM

[75] Inventors: Kouichi Nakayama, Ohtsu; Toshikazu Fukui, Hirakata, both of Japan

[73] Assignee: General Co., Ltd., Osaka, Japan

[21] Appl. No.: 09/014,042

[22] Filed: Jan. 27, 1998

[30] Foreign Application Priority Data

Jan. 31, 1997 [JP] Japan .................................... 9-018191

[51] Int. Cl.$^{7}$ ........................................................ B32B 3/00

[52] U.S. Cl. ......................... 428/195; 428/42.1; 428/349; 428/336; 428/522; 156/233; 156/234; 503/227

[58] Field of Search .................................... 428/41.1, 349, 428/195, 336, 522; 156/233, 234; 503/227

[56] References Cited

U.S. PATENT DOCUMENTS

| | | | |
|---|---|---|---|
| 3,359,127 | 12/1967 | Meyer et al. | 117/3.4 |
| 3,922,435 | 11/1975 | Asnes | 428/349 |
| 4,296,216 | 10/1981 | Sakano et al. | 525/66 |
| 4,875,961 | 10/1989 | Oike et al. | 156/234 |
| 4,892,602 | 1/1990 | Like et al. | 156/233 |
| 5,198,284 | 3/1993 | Kitamura et al. | 428/195 |
| 5,198,296 | 3/1993 | Suzuki et al. | 428/336 |
| 5,266,382 | 11/1993 | Tuyuguchi et al. | 428/195 |
| 5,302,433 | 4/1994 | Miyai et al. | 428/42 |
| 5,405,823 | 4/1995 | Fujimura et al. | 503/227 |
| 5,712,045 | 1/1998 | Miyai | 428/522 |

*Primary Examiner*—William Krynski
*Assistant Examiner*—B. Shewareged
*Attorney, Agent, or Firm*—Fitzpatrick, Cella, Harper & Scinto

[57] ABSTRACT

A heat-sensitive transfer medium comprises a base material and superposingly formed thereon a release layer, an intermediate layer and an ink layer in this order. The ink layer contains a colorant, a first resin capable of curing upon reaction with a curing agent, a curing agent that causes the resin to cure, and a second resin capable of inhibiting the reaction of the first resin with the curing agent, and the release layer is formed in a coating weight of from 0.005 g/m$^2$ to 0.4 g/m$^2$. This heat-sensitive transfer medium enables sharp color printing and also can form transferred patterns having a superior rub resistance.

10 Claims, No Drawings

HEAT-SENSITIVE TRANSFER MEDIUM

BACKGROUND OF THE INVENTION

1. Field of the Invention

This invention relates to a heat-sensitive transfer medium that can form sharp color transferred patterns having a superior rub resistance.

2. Related Background Art

Recording processes and recording apparatus suited for individual information processing systems have been developed with the progress of information industries. As one of such recording processes, thermal recording has been recently put into wide use because the apparatus used can be compact and noiseless and has superior operability and readiness for maintenance care. This thermal recording is a process in which a heat-sensitive transfer medium is heated by means of a thermal recording head and a transfer pattern is transferred to a recording medium to obtain a record.

As heat-sensitive transfer mediums used therein, those comprising a base material and an ink layer formed thereon and largely containing a wax were prevailing in the past. However, transferred patterns formed using heat-sensitive transfer mediums having such a structure also largely contain the wax, and hence the transferred patterns may be defaced when rubbed, having a poor rub resistance. After that, in order to improve rub resistance, a heat-sensitive transfer medium has been developed which comprises a base material and, provided thereon, a release layer and an ink layer largely containing a resin. This release layer is provided so that the ink layer can be released and transferred with ease, and is chiefly composed of wax or the like. Also, in this release layer, the gram number of solid content per unit square meter when dried (herein called "coating weight") is commonly from about 0.8 to 4.0 g/m$^2$. However, when patterns are transferred using the heat-sensitive transfer medium of this type, the wax in the release layer moves to the ink layer when heated, and hence the rub resistance originally possessed by the ink layer may become poor to make it impossible to form transferred patterns having the desired rub resistance.

To overcome such a disadvantage, a heat-sensitive transfer medium has been developed which has a structure wherein an intermediate layer chiefly composed of a resin is provided between a release layer and an ink layer so that the wax in the release layer does not come into the ink layer.

Meanwhile, in recent years, there is an increasing demand for color printing that can form transferred patterns in colors. This color printing is a process in which transfer layers having different colors are superimposed to make an image. When a color transferred pattern is formed using the heat-sensitive transfer medium made up to have the intermediate layer described above, the layer contiguous to the surface of an underlying transfer layer is the release layer chiefly composed of wax. Hence, when two or more transfer layers are superimposed, what is called "trailing" and "smearing" may occur, the former being caused when a color of the upper layer of a transferred pattern spreads to make lines and the latter when a color of the lower layer spreads. Also, compared with transferred patterns formed using what is called a resin type heat-sensitive transfer medium, transferred patterns may have a very poor rub resistance, thus the color printing can not be practical in some cases.

SUMMARY OF THE INVENTION

The present invention was made in order to solve the problems discussed above. Accordingly, an object of the present invention is to provide a heat-sensitive transfer medium that enables sharp color printing and also can form transferred patterns having a superior rub resistance.

To achieve the above object, the present invention provides a heat-sensitive transfer medium comprising a base material and superposingly formed thereon a release layer, an intermediate layer and an ink layer in this order;

the ink layer containing a colorant, a first resin capable of curing upon reaction with a curing agent, a curing agent that causes the resin to cure, and a second resin capable of inhibiting the reaction of the first resin with the curing agent; and the release layer being formed in a coating weight of from 0.005 g/m$^2$ to 0.4 g/m$^2$.

DESCRIPTION OF THE PREFERRED EMBODIMENTS

The present invention will be described below in detail.

The heat-sensitive transfer medium is basically comprised of an ink layer, an intermediate layer and a release layer which are superposingly formed on a base material.

[Ink Layer]

The ink layer in the heat-sensitive transfer medium of the present invention contains a colorant, a first resin capable of curing upon reaction with a curing agent, a curing agent that causes the resin to cure, and a second resin capable of inhibiting the reaction of the first resin with the curing agent. Generally, the resin capable of curing upon reaction with a curing agent reacts with the curing agent to commonly form a three-dimensional network structure. This is a curing reaction. When, however, the resin capable of inhibiting the curing reaction is present, a complete three-dimensional network structure is not formed, and hence the ink layer does not completely cure. Thus, because of a cooperative effect attributable to the fact that the release layer has a very small coating weight and the fact that the ink layer is partly cured, the ink layer can have a sufficient adhesion when thermally transferred, and an upper transfer layer can adhere well to a lower transfer layer when superposingly transferred, so that transferred patterns can be superimposed well, as required when color printing is performed. Meanwhile, although the transferred patterns formed are not completely cured, the resin contained is cured enough to have a rub resistance.

a) Colorant

The colorant contained in the ink layer may include conventional dyes or pigments of a carbon black type, a titanium oxide type, an azo dye type, an anthraquinone type, an indigo type, a soluble dye type, a sulfide type, a phthalocyanine type, a quinoneimine type, a cyanine type, a nitroso type, a nitro type, a stilbene type, a quinoline type, a pyrazolone type, a metal complex type, a benzoquinone type, a naphthoquinone type and so forth.

b) Resin capable of curing upon reaction with a curing agent

The resin (first resin) capable of curing upon reaction with a curing agent contained in the ink layer may include resins capable of curing with a curing agent, such as acrylic resins, amino resins, cellulose resins, epoxy resins, phenol resins, polyester resins, and urethane resins. Any of these resins may be used alone or in combination.

As the acrylic resins, conventional acrylic resins may be used without any particular limitations, including, e.g., acrylic resins such as polyacrylamide, polymethyl methacrylate, polybutyl methacrylate, polymethyl acrylate, polybutyl acrylate, polystyrene-2-acrylonitrile, acrylonitrile-vinyl acetate copolymer, acrylonitrile-vinyl chloride copolymer, acrylonitrile-styrene copolymer, acrylonitrile-vinylidene chloride copolymer, acrylonitrile-vinylpyridine copolymer, acrylonitrile-methyl methacrylate copolymer, and acrylonitrile-butyl acrylate copolymer.

As the amino resins, conventional amino resins may be used without any particular limitations, including, e.g., melamine resins such as melamine-formaldehyde resin, monomethylolmelamine resin, dimethylolmelamine resin, trimethylolmelamine resin, tetramethylolmelamine resin, and hexamethylolmelamine resin; and urea resins such as methylurea resin, ethylurea resin, isopropylurea resin, butylurea resin, methylolurea resin, ethylolurea resin, dimethylolurea resin, diethylolurea resin, and dipropyleneurea resin.

As the cellulose resins, conventional cellulose resins may be used without any particular limitations, including, e.g., cellulose resins such as methyl cellulose, ethyl cellulose, carboxymethyl cellulose, carboxyethyl cellulose, hydroxymethyl cellulose, hydroxyethyl cellulose, ethyl hydroxycellulose, ethyl hydroxyethyl cellulose, hydroxypropyl cellulose, nitrocellulose, cellulose acetate, cellulose acetate butyrate, and cellulose triacetate.

As the epoxy resins, conventional epoxy resins may be used without any particular limitations, including, e.g., aliphatic epoxy resins such as bisphenol-A type epoxy resins, bisphenol-F type epoxy resins, phenol novolak type or cresol novolak type epoxy resins, alicyclic epoxy resins, hydrogenated bisphenol-A type or -AD type epoxy resins, propylene glycol glycoxyether, and pentaerythritol polyglycidyl ether; epoxy resins obtained from aliphatic or aromatic amines and epichlorohydrine, epoxy resins obtained from aliphatic or aromatic carboxylic acids and epichlorohydrine, heterocyclic epoxy resins, spriro-ring-containing epoxy resins, epoxy-modified resins, and bromated epoxy resins.

As the phenol resins, conventional phenol resins may be used without any particular limitations, including, e.g., phenol resins such as p-phenylphenol-formaldehyde copolymer, p-octylphenol-formaldehyde copolymer, p-cumylphenol-formaldehyde copolymer, p-tert-butylphenol-formaldehyde copolymer, p-nonylphenol-formaldehyde copolymer, p-cyclohexylphenol-formaldehyde copolymer, p-ethylphenol-formaldehyde copolymer, p-propylphenol-formaldehyde copolymer, p-aminophenol-formaldehyde copolymer, p-hexylphenol-formaldehyde copolymer, p-heptylphenol-formaldehyde copolymer, p-octylphenol-acetaldehyde copolymer, p-phenylphenol-acetaldehyde copolymer, and p-tert-butylphenol-acetaldehyde copolymer.

As the polyester resins, conventional saturated or unsaturated polyester resins may be used without any particular limitations, including, e.g., polyester resins obtained by allowing dicarboxylic acids or derivatives thereof to react with diols or derivatives thereof. The dicarboxylic acids or derivatives thereof may include dicarboxylic acids or derivatives thereof capable of forming esters, such as terephthalic acid, isophthalic acid, phthalic acid, 2,5-dimethylphthalic acid, 2,6-naphthalenedicarboxylic acid, biphenylphthalic acid, bis-α,β-(2-chlorophenoxy)ethane-4,4'-dicarboxylic acid, oxalic acid, malonic acid, succinic acid, glycolic acid, adipic acid, sebacic acid, 1,2-cyclohexanedicarboxylic acid, 1,4-cyclohexanedicarboxylic acid, 1,3-cyclohexanedicarboxylic acid, 1,3-cyclopentanedicarboxylic acid, sulfoterephthalic acid, 5-sulfoisophthalic acid, 4-sulfophthalic acid, 4-sulfonaphthalene-2,7-dicarboxylic acid, sulfo-p-quinolylene glycol, and 2-sulfo-1,4-bis(hydroxyethoxy) benzene.

The diols or derivatives thereof may include ethylene glycol, 1,3-propanediol, 1,4-butanediol, 1,2-propylene glycol, neopentyl glycol, diethylene glycol, polymethylene glycols having 2 to 10 carbon atoms, such as trimethylene glycol, tetramethylene glycol, pentamethylene glycol, hexamethylene glycol, and decamethylene glycol; aliphatic diols such as 1,4-cyclohexanedimethanol, 1,6-hexanediol, 1,3-cyclohexanedimethanol, 1,2-cyclohexanedimethanol, and p-xylene glycol; aromatic diols such as hydroquinone, resorcinol, and 2,2-bis(4-hydroxyphenyl)propane; aliphatic diols such as 1,4-dihydroxymethylbenzene; and polyalkylene glycols (polyoxyalkylene glycols) such as polyethylene glycol, and polypropylene glycol.

As the urethane resins, conventional urethane resins may be used without any particular limitations, including, e.g., those obtained by allowing diol components such as polyester diol, polyether diol and polyester polyether diol to react with diisocyanates such as tolylene diisocyanate, diphenylmethane diisocyanate, hexamethylene diisocyanate and isophorone diisocyanate; and those obtained by allowing prepolymers having isocyanate groups at both terminals to react with chain extenders, the former prepolymers being obtained by allowing the above polyester diol, polyether diol, polyester polyol or the like to react with the above diisocyanate component and the latter extenders including diamines such as hexamethylenediamine, 4,4'-diaminodiphenylmethane and isophorone diamine, and diols such as ethylene glycol, propylene glycol and 1,4-butanediol.

c) Curing agent

The curing agent referred to in the present invention is a compound capable of reacting with a functional group present in the resin, as exemplified by a hydroxyl group, a glycidyl group or an amide group, to finally form the three-dimensional network structure.

Such a curing agent may include isocyanate type curing agents, urea type curing agents, melamine type curing agents, aldehyde type curing agents, and vinyl sulfone type curing agents. In particular, isocyanate type curing agents are preferred.

The isocyanate type curing agents may include hexamethylene diisocyanate, 2,4-tolylene diisocyanate, 2,6-tolylene diisocyanate, xylene diisocyanate, isophorone diisocyanate, 4,4-diphenylmethane diisocyanate, and triphenylmethane triisocyanate.

The urea type curing agents may include dimethylolurea, dimethylolethyleneurea, dimethylolpropyleneurea, tetramethylolacetyleneurea, and 4-methoxy-5-dimethypropyleneurea dimethylol.

The melamine type curing agents may include compounds etherified by allowing methylolmelamine derivatives obtained by condensation of melamine with formaldehyde, to react with lower alcohols such as methyl alcohol, ethyl alcohol and isopropyl alcohol, and mixtures of these. The methylolmelamine derivatives may include, e.g., monomethylolmelamine, dimethylolmelamine, trimethylolmelamine, tetramethylolmelamine, pentamethylolmelamine, and hexamethylolmelamine.

The aldehyde type curing agents may include formaldehyde and acetaldehyde.

The vinyl sulfone type curing agents may include N,N'-methylene-bis(vinylsulfonylacetamido)ethane and N,N'-ethylene-bis(vinylsulfonylacetamido)ethane.

d) Resin capable of inhibiting the reaction of the first resin with the curing agent The resin (second resin) capable of inhibiting the reaction of the first resin with the curing agent is a resin that restrains the three-dimensional network structure from being formed by the reaction of the first resin with the curing agent that causes the first resin to cure. Such a resin may include, e.g.;

(i) resins such that the second, inhibitory resin does not chemically react at all with either the curing agent and the first resin capable of curing upon reaction with the curing agent, or has a low reactivity with them, but enters the boundaries between the curing agent and the first resin capable of curing upon reaction with the curing agent, to physically restrain the formation of the three-dimensional network structure;

(ii) resins such that the second, inhibitory resin reacts with the curing agent to thereby restrain the three-dimensional network structure from being formed by the reaction of the curing agent with the first resin capable of curing upon reaction with the curing agent;

(iii) resins such that the second, inhibitory resin reacts with the first resin capable of curing upon reaction with the curing agent to thereby restrain the three-dimensional network structure from being formed by the reaction of the curing agent with the first resin capable of curing upon reaction with the curing agent.

The resins-(i) may include polyvinyl chloride type resins, and olefin type resins such as polyethylene and polypropylene. The resins-(ii) may include the epoxy resins described above and styrene resins such as polystyrene resin, acrylonitrile styrene resin, acrylonitrile butadiene styrene resin, styrene butadiene styrene resin, styrene isobutylene styrene resin, styrene-formalin resin, styrene-maleimide copolymer resin and styrene-maleic acid copolymer resin, in the case when the first resin is an acrylic resin, a cellulose resin, an amino resin or a polyester resin and the curing agent is an isocyanate type curing agent, a urea type curing agent or a melamine type curing agent. The resins-(iii) may include acrylic resins such as polyacrylamide, polystyrene-diacrylate, tricyclodecanedimethylol diacrylate and trimethylolpropane triacrylate, cellulose resins such as methyl cellulose, carboxymethyl cellulose and carboxyethyl cellulose, and polyvinyl alcohol resins such as polyvinyl alcohol and polyvinyl butyral, in the case when the first resin is an epoxy resin, a phenol resin, a melamine resin or a urethane resin and the curing agent is an isocyanate type curing agent, a urea type curing agent or a melamine type curing agent.

As the above second "resin capable of inhibiting the reaction of the first resin with the curing agent", either thermosetting resins or thermoplastic resins may be used. In the case when it is necessary to especially increase the rub resistance of transferred patterns, it is preferable to increase the degree of curing of the first resin. In the case when it is necessary to increase the adhesion of transferred patterns to a recording medium, it is preferable to decrease the degree of curing of the first resin.

e) Other components

As components other than the foregoing, the ink layer may preferably contain a wax such as polyethylene wax, microcrystalline wax or carnauba wax, in order to form transferred patterns that can be free from voids and also sharp when transferred to a smooth paper. The ink layer may also contain an ultraviolet-curing resin.

The ink layer may further optionally contain an antioxidant such as a coumarone compound or a phenol compound and an ultraviolet light absorbent such as a benzotriazole compound, a benzophenone compound, a 4-thiazolidone compound or an ultraviolet-absorbing polymer. Besides, the ink layer may also contain organic and/or inorganic fine particles, a release agent, a plasticizer, a dispersant, an infrared light absorbent, an antistatic agent, a defoamer, a leveling agent and so forth.

f) Coating weight and viscosity

The ink layer may preferably have a coating weight of from 0.5 to 10 g/m$^2$. The ink layer may have a fairly high viscosity. For example, when the first resin capable of curing upon reaction with a curing agent or the second resin capable of inhibiting the reaction of the first resin with the curing agent is a thermoplastic resin, the ink layer may have a viscosity of 1,000 cP or more without any problem, as a value measured at a temperature higher by 30° C. than the melting point of the resin.

The weight ratio of a curing agent to the first resin capable of curing upon reaction with the curing agent, both contained in the ink layer, is preferably 1:10 to 2:1. If the curing agent is present in a lower amount, since the ink layer is not sufficiently cured, the transferred pattern with a desired rub resistance cannot be formed. On the other hand, if the curing agent is present in a greater amount, since the ink layer is over-cured, an upper transferred layer is not sufficiently adhered to a lower transferred layer when overlapped and therefore, overlapping of the transferred patterns, which is necessary for color printing, cannot be satisfactorily conducted.

The weight ratio of a curing agent to the second resin capable of inhibiting the reaction of the first resin with the curing agent is preferably 1:10 to 10:1. If the second resin is present in a greater amount, since the ink layer is not sufficiently cured, the transferred pattern with a desired rub resistance cannot be formed. On the other hand, if the second resin is present in a lower amount, since the ink layer is over-cured, an upper transferred layer is not sufficiently adhered to a lower transferred layer when overlapped and therefore, overlapping of the transferred patterns, which is necessary for color printing, cannot be satisfactorily conducted.

The weight ratio of the first resin capable of curing upon reaction with a curing agent to the second resin capable of inhibiting the reaction of the first resin with the curing agent is preferably 2:5 to 5:1. If the second resin is present in a lower amount, since the ink layer is over-cured, an upper transferred layer is not sufficiently adhered to a lower transferred layer when overlapped and therefore, overlapping of the transferred patterns, which is necessary for color printing, cannot be satisfactorily conducted. On the other hand, if the second resin is present in a greater amount, since the ink layer is not sufficiently cured, the transferred pattern with a desired rub resistance cannot be formed.

Therefore, the weight ratio of a curing agent to the first resin to the second resin is preferably 1:10:25 to 10:5:1.

[Intermediate Layer]

The intermediate layer is provided between the release layer and the ink layer so that the wax in the release layer can be prevented from moving to the ink layer at the time of thermal transfer.

This intermediate layer may preferably contain a resin in order to improve the rub resistance of transferred patterns and also in order to ensure the adhesion between the release layer and the intermediate layer and between the intermediate layer and the ink layer. Like the first resin in the ink layer, this resin may preferably be a resin capable of curing upon reaction with a curing agent, and a curing agent that causes the resin to cure may preferably be used. As the resin, the first resin previously described in relation to the ink layer may be used. In particular, at least one resin selected from the group consisting of acrylic resins, amino resins and cellulose resins is preferred. As the curing agent too, those previously described in relation to the ink layer may be used.

In order to better ensure the adhesion between the release layer and the intermediate layer and between the intermediate layer and the ink layer, a low-melting resin may be added in addition to the above resin. The low-melting resin may include N-hydroxymethylstearic acid amide, stearic acid amide, palmitic acid amide, oleic acid amide, ethylenebisstearic acid amide, methylenebis hydrogenated beef tallow fatty acid amide, ricinoleic acid amide, naphthol derivatives such as 2-benzyloxynaphthalene, biphenyl derivatives such as p-benzylbiphenyl and 4-allyloxybiphenyl, polyether compounds such as 1,2-bis(3-methylphenoxy)ethane, 2,2'-bis(4-methoxyphenoxy)diethyl ether and bis(4-methoxyphenoxy)ether, ester derivatives such as diphenyl carbonate, dibenzyl oxalate and p-methylbenzyl oxalate, ketone resins, aldehyde resins, rosin resins, and petroleum resins. A filler such as clay or calcium carbonate may also be optionally added.

The intermediate layer may preferably have a coating weight of from 0.01 to 1.00 g/m$^2$. If it has a coating weight less than 0.01 g/m$^2$, the wax in the release layer can not be adequately prevented from moving to the ink layer at the time of thermal transfer. If, on the other hand, it has a coating weight more than 1.00 g/m$^2$, the intermediate layer positioned above the ink layer may be too thick for the resulting transferred patterns to form sharp transferred patterns.

[Release Layer]

The release layer chiefly plays a role as a layer that controls the adhesion between the ink layer formed above it, and the base material. For example, this is a layer provided so that the intermediate layer or ink layer can peel with ease from the base material upon heating on the support back (the side on which the layers such as the release layer are not formed) by a thermal head or the like.

As materials contained in the release layer, it is preferable to use those having a melting point or softening point within the range of usually from 50 to 150° C., and particularly from 60 to 120° C., or those coming to have a melting point or softening point within this range when used in combination of two or more kinds. Such materials may include, e.g., waxes such as polyethylene wax, carnauba wax and microcrystalline wax; and thermoplastic resins such as polyethylene type copolymers, polyacrylates or polymethacrylates, vinyl chloride type polymers or copolymers, and polyester resins.

In the present invention, the release layer has a coating weight of from 0.005 to 0.4 g/m$^2$, which is much smaller than the amount conventionally employed. If it has a coating weight smaller than 0.005 g/m$^2$, the intermediate layer and the like can not peel smoothly, so that the transfer from the heat-sensitive transfer medium to the medium to which patterns are to be transferred (the recording medium) can not be performed well. If, on the other hand, it has a coating weight more than 0.4 g/m$^2$, the transfer layers can not be superimposed well at the time of color printing. In particular, the release layer may have a coating weight of from 0.005 to 0.1 g/m$^2$, which is preferable in order to achieve a good transfer to the recording medium and also to properly superimpose the transfer layers.

In addition to the component described above, the release layer may optionally appropriately contain other components so long as the object of the present invention is not damaged. For example, they may include fillers such as organic fillers and alumina, thermosetting resins such as thermosetting acrylic resins and epoxy resins, higher fatty acids, higher alcohols, higher fatty esters, amides, and higher amines. When used, any of these may be used alone or in combination of two or more kinds. In addition to the components described above, the release layer may further contain a surface active agent to control its releasability. Typical surface active agents usable in the present invention may include compounds containing a polyoxyethylene chain. Inorganic or organic fine particles such as metal powder or silica gel or oils such as linseed oil or mineral oil may be further added.

[Base Material]

The base material used in the present invention may include polysulfone film, polystyrene film, polyamide film, polyimide film, polycarbonate film, polypropylene film, cellophane, polyester films such as polyethylene terephthalate film, polyethylene naphthalate film, triacetate film, and thin papers such as condenser paper and glassine paper. In particular, polyester films are preferred in view of cost, mechanical strength, dimensional stability, heat resistance and so forth.

Any of these base materials used may have a thickness of usually from 1 to 30 μm, and preferably from 2 to 15 μm. A heat-resistant layer containing a reaction product of, e.g., silicone resin or polyvinyl butyral resin with isocyanate resin may preferably be formed on the base material on its side opposite to the side on which the release layer and so forth are formed.

[Production Process]

The heat-sensitive transfer medium of the present invention can be produced in the following way.

On one side of the base material such as polyester film with a thickness of from 1 to 30 μm, the wax such as carnauba wax is coated so as to be in a coating weight of from 0.005 to 0.4 g/m$^2$, followed by drying to form the release layer. On the opposite side of this base material, it is preferable to form the heat-resistant layer by coating a solution containing silicone resin or the like, so as to be in a coating weight of from 0.1 to 0.8 g/m$^2$, followed by drying. On the release layer thus formed, a solution containing the thermosetting resin such as amino resin or the like or the thermoplastic resin such as cellulose resin, acrylic resin or the like is coated so as to be in a coating weight of from 0.01 to 1.00 g/m$^2$, followed by drying to form the intermediate layer. On the intermediate layer thus formed, a solution containing the pigment or dye for producing a desired color, the first resin which is a thermosetting resin such as amino resin or thermoplastic resin such as polyester resin, cellulose resin or acrylic resin, the curing agent of an isocyanate type or urea type corresponding to any of these resins and the second resin capable of inhibiting the reaction of the first resin with the curing agent is coated so as to be in a coating weight of from 0.5 to 10 g/m$^2$, followed by drying to form the ink layer. Thus, the heat-sensitive transfer medium of the present invention can be produced. The above release layer, intermediate layer, ink layer and heat-resistant layer may be coated using any conventional coating means including blade coaters, roll coaters, air knife coaters, bar coaters, rod coaters, gate roll coaters, curtain coaters, short dwell coaters, gravure coaters and flexogravure coaters of various types. After the coating, the surface may be finished using a calender such as a machine calender, a TG calender, a supercalender or a soft calender.

EXAMPLES

The present invention will be described below in greater detail by giving Examples.

Example 1

On one side of a polyester film with a thickness of 6 μm, a solution having composition (1) shown below was coated so as to be in a coating weight of 0.2 g/m$^2$, followed by drying to form a heat-resistant layer. Composition (1): DIAROMER SP712 (trade name; silicone resin, available

| | |
|---|---|
| from Dainichiseika Kogyo) | 20 wt. % |
| Methyl ethyl ketone | 80 wt. % |

Next, on the other side of the above polyester film, a solution having composition (2) shown below was coated so as to be in a coating weight of 0.05 $g/m^2$, followed by drying to form a release layer. Composition (2):

| | |
|---|---|
| Carnauba wax | 5 wt. % |
| Polyethylene wax | 5 wt. % |
| Toluene | 90 wt. % |

Next, on the release layer thus formed, a solution having composition (3) shown below was coated so as to be in a coating weight of 0.4 $g/m^2$, followed by drying to form an intermediate layer. Composition (3):

| | |
|---|---|
| ACRYDIC A810-45 (trade name; thermosetting acrylic resin, available from Dainippon Ink and Chemicals, Incorporated; solid content: 45%) | 11 wt. % |
| BURNOCK D800 (trade name; isocyanate, available from Dainippon Ink and Chemicals, Incorporated; solid content: 50%) | 3 wt. % |
| Methyl ethyl ketone | 86 wt. % |

Next, on the intermediate layer thus formed, a solution having composition (4) shown below was coated so as to be in a coating weight of 1.3 $g/m^2$, followed by drying to form an ink layer. Thus, a cyan heat-sensitive transfer medium was obtained. Composition (4):

| | |
|---|---|
| Cyanine Blue | 10 wt. % |
| UE-3380 (trade name; polyester resin, available from Unichika, Ltd.) | 20 wt. % |
| EPIKOTE 1002 (trade name; epoxy resin, available from Yuka Shell Epoxy Kabushiki Kaisha) | 10 wt. % |
| BURNOCK D800 (trade name; isocyanate, available from Dainippon Ink and Chemicals, Incorporated; solid content: 50%) | 5 wt. % |
| Calcium carbonate | 5 wt. % |
| Methyl ethyl ketone | 50 wt. % |

In this heat-sensitive transfer medium, the polyester resin contained in the ink layer reacts with the curing agent isocyanate to cure to form a three-dimensional network structure. However, the isocyanate also reacts with the epoxy resin. That is, the epoxy resin inhibits the reaction of the polyester resin with the isocyanate, and hence the polyester resin does not completely cure. Thus, the ink layer itself adheres well to the recording medium because of the adhesion attributable to the polyester resin having partly cured.

Example 2

A magenta heat-sensitive transfer medium was obtained in the same manner as in Example 1 except that the cyanine blue in composition (4) of Example 1 was replaced with Carmine 6B.

Example 3

A yellow heat-sensitive transfer medium was obtained in the same manner as in Example 1 except that the cyanine blue in composition (4) of Example 1 was replaced with chrome yellow.

Example 4

A cyan heat-sensitive transfer medium was obtained in the same manner as in Example 1 except that UE-3380 (polyester resin) in composition (4) of Example 1 was replaced with PLYOHEN 5010 (trade name; phenol resin, available from Dainippon Ink and Chemicals, Incorporated).

Example 5

A magenta heat-sensitive transfer medium was obtained in the same manner as in Example 1 except that UE-3380 (polyester resin) in composition (4) of Example 1 was replaced with PLYOHEN 5010 (trade name; phenol resin, available from Dainippon Ink and Chemicals, Incorporated) and the cyanine blue was replaced with Carmine 6B.

Example 6

A yellow heat-sensitive transfer medium was obtained in the same manner as in Example 1 except that UE-3380 (polyester resin) in composition (4) of Example 1 was replaced with PLYOHEN 5010 (trade name; phenol resin, available from Dainippon Ink and Chemicals, Incorporated) and the cyanine blue was replaced with chrome yellow.

Example 7

A cyan heat-sensitive transfer medium was obtained in the same manner as in Example 1 except that UE-3380 (polyester resin) in composition (4) of Example 1 was replaced with SUPER BECKAMINE L806-60 (trade name; amino resin, available from Dainippon Ink and Chemicals, Incorporated).

Example 8

A magenta heat-sensitive transfer medium was obtained in the same manner as in Example 1 except that UE-3380 (polyester resin) in composition (4) of Example 1 was replaced with SUPER BECKAMINE L806-60 (trade name; amino resin, available from Dainippon Ink and Chemicals, Incorporated) and the cyanine blue was replaced with Carmine 6B.

Example 9

A yellow heat-sensitive transfer medium was obtained in the same manner as in Example 1 except that UE-3380 (polyester resin) in composition (4) of Example 1 was replaced with SUPER BECKAMINE L806-60 (trade name; amino resin, available from Dainippon Ink and Chemicals, Incorporated) and the cyanine blue was replaced with chrome yellow.

Examples 10 to 12

Cyan, magenta and yellow heat-sensitive transfer mediums were obtained in the same manner as in Examples 1 to 3, respectively, except that ACRYDIC A810-45 (thermosetting acrylic resin) in composition (3) of Examples 1 to 3 was replaced with SUPER BECKAMINE L806-60 (trade name; amino resin, available from Dainippon Ink and Chemicals, Incorporated).

Examples 13 to 15

Cyan, magenta and yellow heat-sensitive transfer mediums were obtained in the same manner as in Examples 1 to 3, respectively, except that ACRYDIC A810-45 (thermosetting acrylic resin) in composition (3) of Examples 1 to 3 was replaced with ST-222 (trade name; cellulose resin, available from Washin Chemicals Co., Ltd.).

Comparative Examples 1 to 3

Cyan, magenta and yellow heat-sensitive transfer mediums were obtained in the same manner as in Examples 1 to 3, respectively, except that EPIKOTE 1002 (epoxy resin) in composition (4) of Examples 1 to 3 was replaced with UE-3380 (trade name; polyester resin, available from Unichika, Ltd.).

Comparative Examples 4 to 6

Cyan, magenta and yellow heat-sensitive transfer mediums were obtained in the same manner as in Examples 1 to 3, respectively, except that the coating weight of the release layer was changed to 0.5 g/m$^2$.

Examples 16 to 18

Cyan, magenta and yellow heat-sensitive transfer mediums were obtained in the same manner as in Examples 4 to 6 except that EPIKOTE 1002 (epoxy resin) in composition (4) of Examples 4 to 6 was replaced with B17S (trade name; polyvinyl alcohol resin, available from DENKIKAGAKU KOGYO K. K.).

In these heat-sensitive transfer mediums, the phenol resin contained in the ink layer reacts with the curing agent isocyanate to cure to form a three-dimensional network structure at the time of heat transfer. However, the curing agent isocyanate also reacts with the polyvinyl alcohol resin. That is, the polyvinyl alcohol resin inhibits the reaction of the phenol resin with the isocyanate, and hence the phenol resin does not completely cure. Thus, the ink layer itself well adheres to the recording medium because of the adhesion attributable to the phenol resin having partly cured.

Examples 19 to 21

Cyan, magenta and yellow heat-sensitive transfer mediums were obtained in the same manner as in Examples 4 to 6 except that EPIKOTE 1002 (epoxy resin) in composition (4) of Examples 4 to 6 was replaced with DENKAVINYL 10000AKT (trade name; polyvinyl chloride resin, available from DENKIKAGAKU KOGYO K. K.).

In these heat-sensitive transfer mediums, the phenol resin contained in the ink layer reacts with the curing agent isocyanate to cure to form a three-dimensional network structure at the time of heat transfer. On the other hand, the polyvinyl chloride resin reacts with neither the phenol resin nor the isocyanate. Therefore, since the polyvinyl chloride resin enters the boundaries between the phenol resin and the isocyanate to restrain the reaction of them, the phenol resin does not completely cure. Thus, the ink layer itself adheres well to the recording medium because of the adhesion attributable to the phenol resin having partly cured.

Examples 22 to 24

Cyan, magenta and yellow heat-sensitive transfer mediums were obtained in the same manner as in Example 4 to 6 except that BURNOCK D800 (isocyanate) in composition (4) of Examples 4 to 6 was replaced with NIKARACK MW 12LF (trade name; melamine type curing agent; available from SANWA CHEMICAL K. K.; solid content: 50%).

Example 25

A cyan heat-sensitive transfer medium was obtained in the same manner as in Example 4 except that the ink layer was formed as follows:

On the intermediate layer formed, a solution having composition (25-1) shown below was coated so as to be in a coating weight of 1.3 g/m$^2$, followed by drying to form an ink layer. Composition (25-1):

| | |
|---|---|
| Cyanine Blue | 10 wt. % |
| EPIKOTE 1002 (trade name; epoxy resin, available from Yuka Shell Epoxy Kabushiki Kaisha) | 20 wt. % |
| ACRYDICK A810-45 (trade name; thermosetting acrylic resin; available from Dainippon Ink and Chemicals, Incorporated; solid content: 45%) | 20 wt. % |
| BURNOCK D800 (trade name; isocyanate; available from Dainippon Ink and Chemicals, Incorporated; solid content: 50%) | 5 wt. % |
| Calcium carbonate | 5 wt. % |
| Methyl ethyl ketone | 40 wt. % |

Examples 26 to 27

Magenta and yellow heat-sensitive transfer mediums were obtained in the same manner as in Example 25 except that cyanine blue in Example 25 was replaced with Carmine 6B and chrome yellow, respectively.

Examples 28 to 30

Cyan, magenta and yellow heat-sensitive transfer mediums were obtained in the same manner as in Examples 25 to 27 except that BURNOCK D800 (isocyanate) was replaced with NIKARACK MW 12LF (trade name; melamine type curing agent; available from SANWA CHEMICAL K. K.; solid content: 50%).

Comparative Example 7

A cyan heat-sensitive transfer medium was obtained in the same manner as in Example 1 except that composition (4) of Example 1 was replaced with the following composition. Composition (7-1):

| | |
|---|---|
| Cyanine Blue | 10 wt. % |
| UE-3380 (trade name; polyester resin, available from Unichika, Ltd.) | 23 wt. % |
| EPIKOTE 1002 (trade name; epoxy resin, available from Yuka Shell Epoxy Kabushiki Kaisha) | 10 wt. % |
| BURNOCK D800 (trade name; isocyanate, available from Dainippon Ink and Chemicals, Incorporated; solid content: 50%) | 2 wt. % |
| Calcium carbonate | 5 wt. % |
| Methyl ethyl ketone | 50 wt. % |

Comparative Examples 8 to 9

Magenta and yellow heat-sensitive transfer mediums were obtained in the same manner as in Comparative Example 7 except that cyanine blue in composition (7-1) of Comparative Example 7 was replaced with Carmine 6B and chrome yellow, respectively.

Comparative Example 10

A cyan heat-sensitive transfer medium was obtained in the same manner as in Example 1 except that composition (4) of Example 1 was replaced with the following composition. Composition (10-1):

| | |
|---|---|
| Cyanine Blue | 10 wt. % |
| UE-3380 (trade name; polyester resin, available from Unichika, Ltd.) | 10 wt. % |
| EPIKOTE 1002 (trade name; epoxy resin, available from Yuka Shell Epoxy Kabushiki Kaisha) | 2 wt. % |
| BURNOCK D800 (trade name; isocyanate, available from Dainippon Ink and Chemicals, Incorporated; solid content: 50%) | 50 wt. % |
| Calcium carbonate | 5 wt. % |
| Methyl ethyl ketone | 23 wt. % |

Comparative Examples 11 to 12

Magenta and yellow heat-sensitive transfer mediums were obtained in the same manner as in Comparative Example 10 except that cyanine blue in composition (10-1) of Comparative Example 10 was replaced with Carmine 6B and chrome yellow, respectively.

Comparative Example 13

A cyan heat-sensitive transfer medium was obtained in the same manner as in Example 1 except that composition (4) of Example 1 was replaced with the following composition. Composition (13-1):

| | |
|---|---|
| Cyanine Blue | 10 wt. % |
| UE-3380 (trade name; polyester resin, available from Unichika, Ltd.) | 10 wt. % |
| EPIKOTE 1002 (trade name; epoxy resin, available from Yuka Shell Epoxy Kabushiki Kaisha) | 30 wt. % |
| BURNOCK D800 (trade name; isocyanate, available from Dainippon Ink and Chemicals, Incorporated; solid content: 50%) | 5 wt. % |
| Calcium carbonate | 5 wt. % |
| Methyl ethyl ketone | 40 wt. % |

Comparative Examples 14 to 15

Magenta and yellow heat-sensitive transfer mediums were obtained in the same manner as in Comparative Example 13 except that cyanine blue in composition (13-1) of Comparative Example 13 was replaced with Carmine 6B and chrome yellow, respectively.

Comparative Examples 16 to 18

Cyan, magenta and yellow heat-sensitive transfer mediums were obtained in the same manner as in Comparative Example 13 except that EPIKOTE 1002 (epoxy resin) in composition (13-1) of Comparative Examples 13 was replaced with DENKAVINYL 1000OAKT (trade name; polyvinyl chloride resin, available from DENKIKAGAKU KOGYO K. K.).

[Evaluation Test]

Using the cyan, magenta and yellow heat-sensitive transfer mediums obtained in Examples 1 to 15 and Comparative Examples 1 to 6, full-color transferred patterns were formed by means of a thermal printer NCP-710 (manufactured by Nozaki Insatsushigyo K. K.), and the prints obtained were visually observed. The results were evaluated as "A" when good, "C" when poor.

An eraser made of plastic was attached to a rubbing tester (manufactured by Yasuda Seiki Seisakusho), and the transferred patterns were rubbed at like portions under a load of $4.7\times10^4$ Pa. How the transferred patterns stood after being rubbed 500 times was visually observed, and rub resistance was evaluated as "A" when the patterns completely remained, "B" when partly remained, and "C" when almost all defaced. Also, a cotton plate impregnated with ethyl alcohol was attached to a rubbing tester (manufactured by Yasuda Seiki Seisakusho), and the transferred patterns were rubbed at like portions under a load of $2.9\times10^5$ Pa. How the transferred patterns stood after rubbed 500 times was visually observed, and solvent resistance was evaluated as "A" when the patterns completely remained, "B" when partly remained, and "C" when almost all defaced.

The results of the above tests are shown in Table 1.

TABLE 1

| | Visual observation | Rub resistance | Solvent resistance |
|---|---|---|---|
| Examples: | | | |
| 1 to 3 | A | A | A |
| 4 to 6 | A | A | A |
| 7 to 9 | A | A | A |
| 10 to 12 | A | A | A |
| 13 to 15 | A | A | A |
| 16 to 18 | A | A | A |
| 19 to 21 | A | A | A |
| 22 to 24 | A | A | A |
| 25 to 27 | A | A | A |
| 28 to 30 | A | A | A |
| Comparative Examples: | | | |
| 1 to 3 | C*1 | C | B |
| 4 to 6 | C*2 | C | C |
| 7 to 9 | C | B | B |
| 10 to 12 | A | C | C |
| 13 to 15 | C | C | C |
| 16 to 18 | A | C | C |

*1: Impossible to form color images.
*2: Trailing and smearing occurred.

As is seen from Table 1, full-color transferred patterns which were sharp according to visual observation and had superior rub resistance and solvent resistance were obtained in the case when the heat-sensitive transfer mediums prepared in Examples 1 to 15 were used. On the other hand, in the case of the heat-sensitive transfer mediums prepared in Comparative Examples 1 to 3, it was impossible to form full-color transferred patterns and the transferred patterns obtained had inferior rub resistance and solvent resistance. The reason therefor is considered to be as follows: in the ink layer in Comparative Examples 1 to 3, the second resin capable of inhibiting the reaction of the first resin with the curing agent is not present and hence the resin and the curing agent completely forms a three-dimensional network structure, so that the ink layer has insufficient adhesion to the recording medium. Thus, even though the three-dimensional network structure should originally provide good rub resistance and solvent resistance, full-color transferred patterns can not be formed when ink layers are superimposed, because of lack of adhesion, resulting in inferior rub resistance and solvent resistance.

In the case of Comparative Examples 4 to 6, in which the release layer containing the wax was formed in a coating weight of 0.5 $g/m^2$, good full-color transferred patterns could not be formed because of the occurrence of "trailing" and "smearing", and also, the transferred patterns obtained had inferior rub resistance and solvent resistance. The reason therefor is considered to be as follows: the release layer has so large a coating weight that the wax component dissolving at the time of thermal transfer permeates into the ink layer, so that the rub resistance and solvent resistance of the ink layer are damaged and also the colorant in the ink layer flows out of the original position at which a pattern has been transferred.

In the case of the heat-sensitive transfer mediums prepared in Comparative Examples 7 to 9, it was impossible to form full-color transferred patterns and the transferred patterns obtained had inferior rub resistance and solvent resistance. The reason therefor is considered to be as follows: in the ink layer in Comparative Examples 7 to 9, the first resin capable of curing upon reaction with the curing agent is excessively present, that is, there is a minor content of the second resin capable of inhibiting the reaction of the first resin with the curing agent, and hence the resin and the curing agent completely form a three-dimensional network structure, so that the ink layer has insufficient adhesion to the recording medium. Thus, even though the three-dimensional network structure should originally provide good rub resistance and solvent resistance, full-color transferred patterns can not be formed when ink layers are superimposed, because of lack of adhesion, resulting in inferior rub resistance and solvent resistance.

In the case of the heat-sensitive transfer mediums prepared in Comparative Examples 10 to 12, full-color transferred patterns could be formed. However, the transferred patterns obtained had inferior rub resistance and solvent resistance. The reason therefor is considered to be as follows: in the ink layer in Comparative Examples 10 to 12, the curing agent is excessively present, that is, there are minor contents of the first resin capable of curing upon reaction with the curing agent and the second resin capable of inhibiting the reaction of the first resin with the curing agent, respectively, and hence the ink layer is not sufficiently cured. Therefore, although full-color transferred patterns can be formed, rub resistance and solvent resistance are inferior.

In the case of the heat-sensitive transfer mediums prepared in Comparative Examples 13 to 15, it was impossible to form full-color transferred patterns and the transferred patterns obtained had inferior rub resistance and solvent resistance. The reason therefor is considered to be as follows: in the ink layer in Comparative Examples 13 to 15, the second resin capable of inhibiting the reaction of the first resin with the curing agent is excessively present. The second resin inhibits the reaction of the first resin with the curing agent due to the reaction of the second resin with the curing agent. Therefore, the second resin excessively reacts with the curing agent, resulting in curing the ink layer. This means that the ink layer does not have sufficient adhesion to a recording medium. As a result, full-color transferred patterns can not be formed when ink layers are superimposed, because of lack of adhesion, resulting in inferior rub resistance and solvent resistance.

In the case of the heat-sensitive transfer mediums prepared in Comparative Examples 16 to 18, full-color transferred patterns could be formed. However, the transferred patterns obtained had inferior rub resistance and solvent resistance. The reason therefor is considered to be as follows: in the ink layer in Comparative Examples 16 to 18, the second resin capable of inhibiting the reaction of the first resin with the curing agent is excessively present. The second resin reacts with neither the first resin nor the curing agent, and hence the ink layer is not sufficiently cured. Therefore, although full-color transferred patterns can be formed, rub resistance and solvent resistance are inferior.

As described above, according to the heat-sensitive transfer medium of the present invention, colors can be superimposed well, so that sharp full-color transferred patterns free of "trailing" and "smearing" can be formed and also the transferred patterns obtained have good rub resistance and solvent resistance.

What is claimed is:

1. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said curing agent is an isocyanate curing agent that is at least one selected from the group consisting of hexamethylene diisocyanate, 2,4-tolylene diisocyanate, 2,6-tolylene diisocyanate, xylene diisocyanate, isophorone diisocyanate, 4,4-diphenylmethane diisocyanate and triphenylmethane triisocyanate.

2. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said curing agent is a urea type curing agent that is at least one selected from the group consisting of dimethylolurea, dimethylolethyleneurea, dimethylolpropyleneurea, tetramethylolacetyleneurea and 4-methoxy-5-dimethypropyleneurea dimethylol.

3. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said curing agent is a melamine curing agent that is a compound etherified by allowing at least one selected from the group consisting of monomethylolmelamine, dimethololmelamine, trimethlolmelamine, tetramethylolmelamine, pentamethylolmelamine and hexamethylolmelamine, to react with at least one selected from the group consisting of methyl alcohol, ethyl alcohol and isopropyl alcohol.

4. A heat-sensitive transfer medium comprising a base material and. superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said curing agent is a vinyl sulfone type curing agent that is at least one selected from the group consisting of N,N'-methylene-bis (vinylsulfonylacetamido)ethane and N,N'-ethylene-bis) vinylsulfonylacetamido)ethane.

5. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said first resin capable of curing upon reaction with said curing agent is an acrylic resin that is at least one selected from the group consisting of polyacrylamide, polymethyl methacrylate, polybutyl methacrylate, polymethyl acrylate, polybutyl acrylate, polystyrene-2-acrylonitrile, acrylonitrile-vinyl acetate copolymer, acrylonitrile-vinyl chloride copolymer, acrylonitrile-styrene copolymer, acrylonitrile-vinylidene chloride copolymer, acrylonitrile-vinylpyridine copolymer, acrylonitrile-methyl methacrylate copolymer and acrylonitrile-butyl acrylate copolymer.

6. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein the weight ratio of said curing agent to said first resin is from 1:10 to 2:1.

7. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein the weight ratio of said curing agent to said second resin is from 1:10 to 10:1.

8. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein the weight ratio of said first resin to said second resin is from 2:5 to 5:1.

9. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein the weight ratio of said curing agent, said first resin and said second resin is from 1:10:25 to 10:5:1.

10. A heat-sensitive transfer medium comprising a base material and, superposingly formed thereon, a release layer, an intermediate layer and an ink layer, in that order, wherein said ink layer comprises a colorant, a curing agent, a first resin capable of curing upon reaction with said curing agent, and a second resin capable of inhibiting the reaction of said first resin with said curing agent, and said release layer is formed in a coating weight of from 0.005 $g/m^2$ to 0.4 $g/m^2$, and wherein said release layer is formed in a coating weight of from 0.005 $g/m^2$ to 0.009 $g/m^2$.

* * * * *

UNITED STATES PATENT AND TRADEMARK OFFICE
CERTIFICATE OF CORRECTION

PATENT NO. : 6,150,008
DATED : November 21, 2000
INVENTOR(S) : Kouichi Nakayama et al.

It is certified that error appears in the above-identified patent and that said Letters Patent is hereby corrected as shown below:

Title page,
Item [56], References Cited, U.S. PATENT DOCUMENTS,
"Like et al." should read -- Oike et al. --.

| | | | |
|---|---|---|---|
| "4,978,580 | 12/1990 | Tezuka et al. | 428/484 |
| 5,328,754 | 7/1994 | Yuyama et al. | 428/212" |

should be inserted.

FOREIGN PATENT DOCUMENTS,

| | | |
|---|---|---|
| "0542208 | 5/1993 | European Pat. Off. |
| 3-166992 | 7/1991 | Japan |
| 3-58888 | 3/1991 | Japan |
| 2-150391 | 6/1990 | Japan" |

should be inserted.

Column 9,
Line 4, ruled line should be between lines 1 and 2.

Column 16,
Line 45, "dimethololmelamine," should read -- dimethylolmelamine, --.
Line 46, "trimethlolmelamine" should read -- trimethylolmelamine --.
Line 51, "and." should read -- and, --.
Line 59, "type" should be deleted.
Line 62, "-bis)" should read -- bis( --.

Signed and Sealed this

Twenty-sixth Day of March, 2002

*Attest:*

JAMES E. ROGAN
*Director of the United States Patent and Trademark Office*

*Attesting Officer*